(12) United States Patent
Tuite

(10) Patent No.: US 11,379,939 B2
(45) Date of Patent: Jul. 5, 2022

(54) REAL ESTATE BUYER REGISTRY

(71) Applicant: Chris Tuite, Boston, MA (US)

(72) Inventor: Chris Tuite, Boston, MA (US)

( * ) Notice: Subject to any disclaimer, the term of this patent is extended or adjusted under 35 U.S.C. 154(b) by 0 days.

(21) Appl. No.: 16/777,119

(22) Filed: Jan. 30, 2020

(65) Prior Publication Data

US 2021/0241398 A1 Aug. 5, 2021

(51) Int. Cl.
*G06Q 50/00* (2012.01)
*G06Q 50/16* (2012.01)
*G06Q 30/06* (2012.01)
*G06F 3/0483* (2013.01)
*G06F 16/9538* (2019.01)
*G06F 16/955* (2019.01)
*G06F 3/0482* (2013.01)

(52) U.S. Cl.
CPC ......... *G06Q 50/163* (2013.01); *G06F 3/0482* (2013.01); *G06F 3/0483* (2013.01); *G06F 16/9538* (2019.01); *G06F 16/9558* (2019.01); *G06Q 30/0625* (2013.01); *G06Q 30/0639* (2013.01); *G06Q 30/0643* (2013.01)

(58) Field of Classification Search
CPC .... G06Q 50/16; G06Q 50/163; G06Q 40/025; G06F 16/9535; G06F 16/9538; G06F 16/245
See application file for complete search history.

(56) References Cited

U.S. PATENT DOCUMENTS

| | | | |
|---|---|---|---|
| 2014/0156540 A1* | 6/2014 | Williams | G06Q 50/16 705/306 |
| 2018/0068400 A1* | 3/2018 | Burris | H04W 4/021 |
| 2019/0287193 A1* | 9/2019 | Quagliata | G06Q 50/163 |

* cited by examiner

*Primary Examiner* — Weiming He
(74) *Attorney, Agent, or Firm* — Lambert Shortell & Connaughton; David J. Connaughton, Jr.; Justin P. Tinger

(57) ABSTRACT

A computerized system is provided for facilitating direct communication between a real estate agent who has listed a property for sale and a potential real estate buyer. The system allows a user to receive the listing agent contact information within the user interface of the computerized system, thereby streamlining the user interface experience and keeping the user engaged with the online platform.

14 Claims, 5 Drawing Sheets

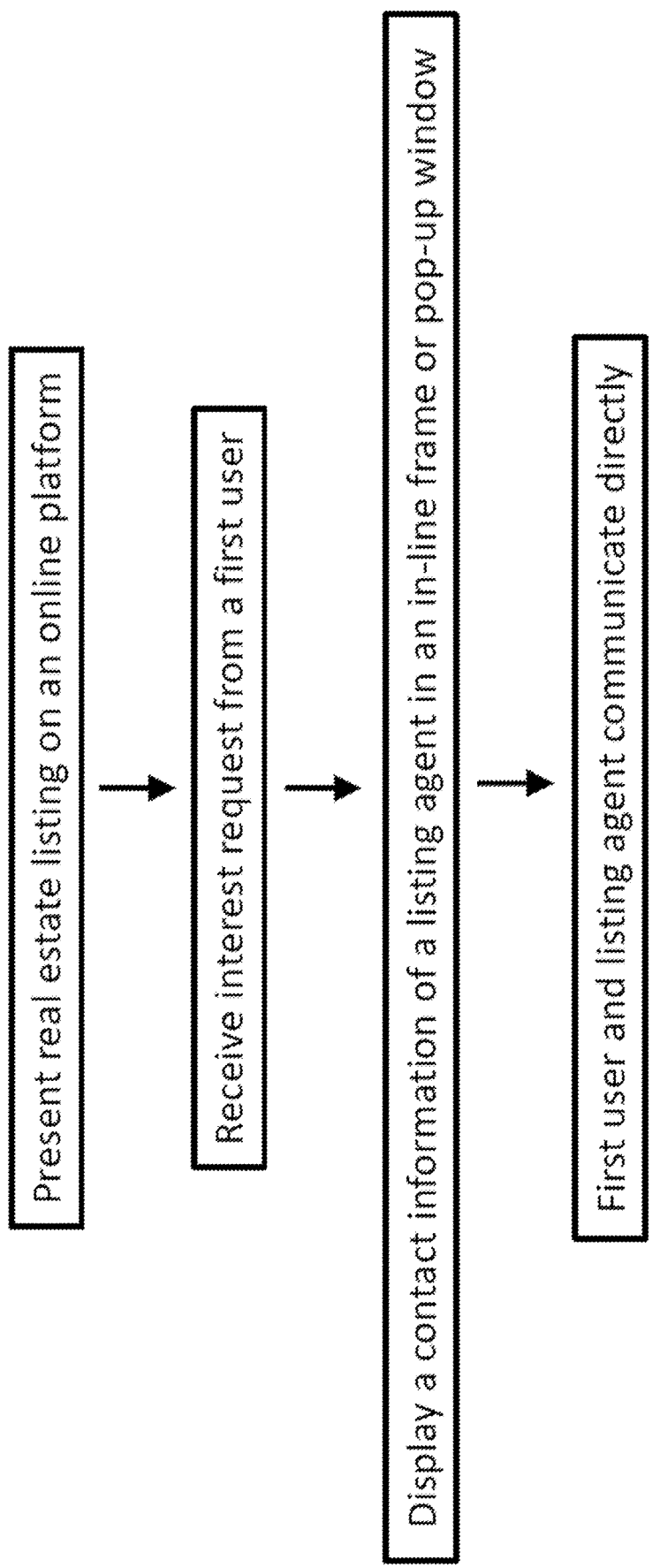

REAL ESTATE BUYER REGISTRY

BACKGROUND

Field of the Invention

The subject matter described herein relates generally to computerized systems to connect real estate buyers and listing agents. More particularly, the present invention relates to a system allowing buyers to be identified and identify seller agents, which provides direct and in-line communication between the parties.

Description of Related Art

The internet has substantially impacted the real estate market. In particular, much information can now be accessed online where it was more limited before. However, the websites which provide this information, such as Zillow® and Realtor.com® fail to provide a way for a consumer (potential home buyer) to contact a listing agent directly. Instead, consumers are directed to a buyer's agent or agents, who pay to be listed by these services. This results in the seller (and indirectly, the buyer) paying two commissions, one to the buyer's agent and one to the listing agent. The consumer has no option to choose whether or not to engage a buyer's agent, or to go directly to the listing agent. The industry thus has essentially decided that every consumer must be represented by a buyer's agent, leading to excessive transaction fees, confusion, and un-solicited buyer agent calls, emails, and texts.

If a buyer goes directly to the listing agent, they are typically able to negotiate a notably better deal, because only the listing agent will take the commission. Sellers always ask why they are paying two commissions and buyers, whether they know it or not, pay more for the house than they would without the buyer's agent adding their commission to the total cost. Typically, this commission is 6% to the seller if there is a buyer agent and 2.5%-%3% if the listing agent can somehow find a qualified buyer, or a buyer could easily be matched directly to the listing agent.

This problem is compounded because every online real estate service caters to buyer agents. There are more buyer agents than for-sale listings, and therefore advertising money to the online services comes from these buyer agents. When a consumer seeks to contact a listing agent, they are instead shifted to a potential buyer's agent, and/or are inundated with calls from buyer agents seeking to represent them. Present online real estate listing services are not operable to allow a user to contact the listing agent. Further still, often consumers are directed away from listing websites to different websites of buyer agents and the like, thereby taking the user away from the site, possibly never to return and at least disrupting the transaction.

When viewing online content, particularly online real estate listing services, users often come across information which can be confused with advertisements, confusing information about who the listing agent is, and the like. One traditional way to find additional information about the home, listing agent, potential buyer agents, and the like, requires the user to leave (either temporarily or indefinitely) the real estate listing service, open up a new browsing tab or window and search for additional information. This takes the user away from the service, and this user may never return. In other words, internet browsing technology has created a problem for online real estate listing services in retaining the users and providing them with the desired information. Usually, these services have worked very hard to get these users to their website in the first place.

The goals of almost all online platforms is to increase drive traffic as well as to keep users in their website for as long as possible. The present application seeks to provide a solution to help users stay within the ecosystem of the real estate listing system's website by, among other things, providing direct access to a listing agent especially within the system user interface, providing a listing source for qualified real estate buyers, and providing a forum for real estate discussion. This will reduce external browsing, which pulls users away at least temporarily and often permanently. Other advantages will also be apparent to those skilled in the art.

Therefore, what is needed is a computerized system that provides a listing of potential qualified buyers, a forum for agents to connect, and a system to connect potential buyers directly to the listing agents, directly within the system's user interface.

SUMMARY

The subject matter of this application may involve, in some cases, interrelated products, alternative solutions to a particular problem, and/or a plurality of different uses of a single system or article.

In one aspect, a computerized system for directly connecting a listing agent and a potential home buyer is provided. The system involves at least one user computer in networked communication with a computerized server, the user computer can access the server and a computerized system stored thereon through an online platform via a user interface. The system also has at least one listing agent computer which is similarly in networked communication with the server. Among other capabilities, the computerized server is operable to carry out the processes to facilitate communication between the listing agent and the interested potential buyer user. The server may receive inputs from the user computers which may include user information and a property interest information. The property interest information may comprise at least one of information selecting one of a plurality of listed property and a property interest search criteria. The server is operable to process and record these received inputs to a memory, and can further operate to present, to the listing agent computer, a communication relating to the received input(s). The agent can respond to these communications through the listing agent computer and the server system user interface. In response to the received interest from a user computer, the server is operable to present, on the user interface of the user's computer, a contact display. The contact display is associated with the user interface and preferably is presented within the existing user interface. This contact display provides contact information of the listing agent to the users, and allows the user and listing agent to directly communicate by the potential buyer initiating contact with the listing agent.

In another aspect, a computerized method for populating an online platform with a contact information of a real estate listing agent is provided. The method begins with the step of presenting, by a computerized server at least one real estate property sale listing on an online platform user interface. The real estate property sale listing comprises at least a price and an address. Next, the server may receive an interest request from a first user. In response to receiving the interest request, the computerized server is operable to cause a user interface of the user computer to display a contact information of a listing agent associated with the at least one real estate property sale listing. This displaying is presented within at least one of an inline frame of the online platform user interface, and a pop up window within the primary viewing page of the online interface. As such, the method allows the listing agent and user of the first user computer to directly communicate.

In yet another aspect, a computerized communication platform for connecting a plurality of real estate agents in a selected real estate market is provided. The platform includes a platform server in networked communication with the internet, a memory, and programming instructions allowing the server to receive a message from a first agent computer. The platform server is operable to save the message to the memory, and automatically generate a posting data file, the posting data file is then accessible through the internet to a second agent computer.

BRIEF DESCRIPTION OF THE DRAWINGS

FIG. 5 provides a flow chart of another embodiment of the present disclosure.

DETAILED DESCRIPTION

Figure 1:
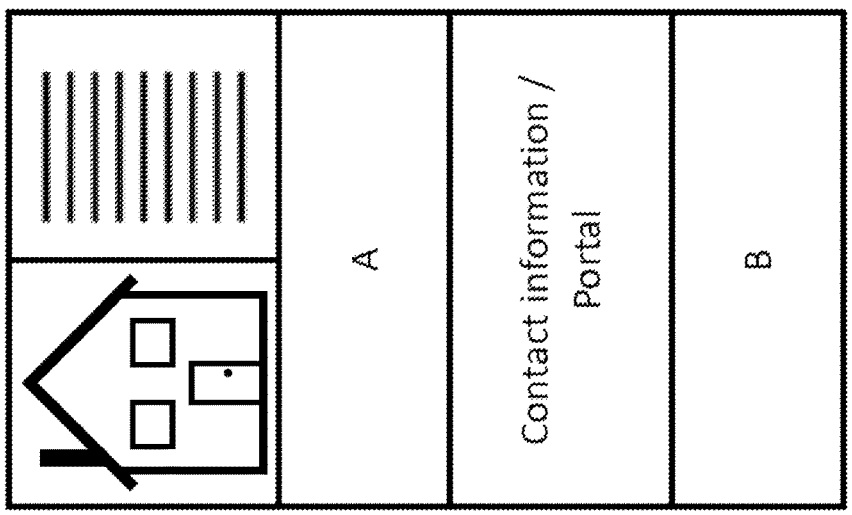
FIG. 1 provides a schematic view of an embodiment of the system which inserts a contact display into the content of the existing online portal.
Figure 1:
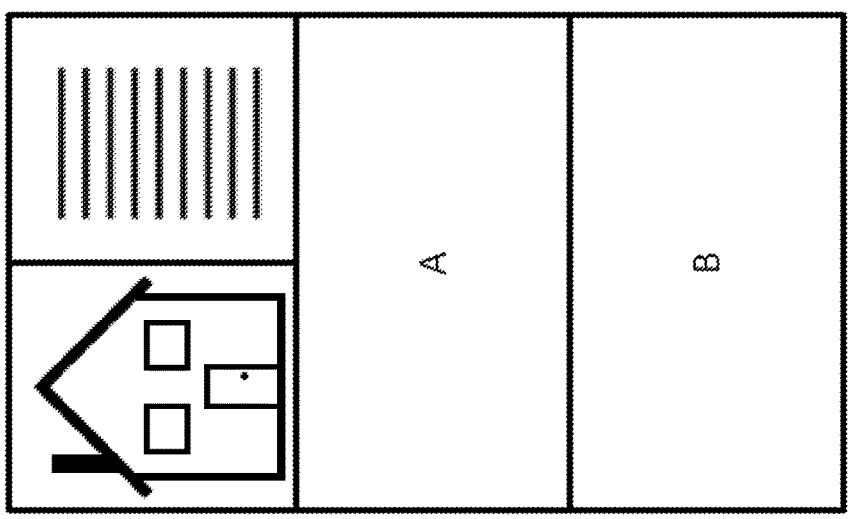

The detailed description set forth below in connection with the appended drawings is intended as a description of presently preferred embodiments of the invention and does not represent the only forms in which the present invention may be constructed and/or utilized. The description sets forth the functions and the sequence of steps for constructing and operating the invention in connection with the illustrated embodiments.

In referring to the description, specific details are set forth in order to provide a thorough understanding of the examples disclosed. In other instances, well-known methods, procedures, components and materials have not been described in detail as not to unnecessarily lengthen the present disclosure.

It should be understood that if an element or part is referred herein as being "on", "against", "in communication with", "connected to", or "coupled to" another element or part, then it can be directly on, against, in communication with, connected or coupled to the other element or part, or intervening elements or parts may be present. When used, term "and/or", includes any and all combinations of one or more of the associated listed items, if so provided.

The terminology used herein is for the purpose of describing particular embodiments only and is not intended to be limiting. As used herein, the singular forms "a", "an", and "the", are intended to include the plural forms as well, unless the context clearly indicates otherwise. It should be further understood that the terms "includes" and/or "including", when used in the present specification, specify the presence of stated features, integers, steps, operations, elements, and/or components, but do not preclude the presence or addition of one or more other features, integers, steps, operations, elements, components, and/or groups thereof not explicitly stated.

Some embodiments of the present invention may be practiced on a computer system that includes, in general, one or a plurality of processors for processing information and instructions, RAM, for storing information and instructions, ROM, for storing static information and instructions, a data storage unit such as a magnetic or optical disk and disk drive for storing information and instructions, modules as software units executing on a processor, an optional user output device such as a display screen device (e.g., a monitor) for display screening information to the computer user, and an optional user input device.

As will be appreciated by those skilled in the art, the present examples may be embodied, at least in part, a computer program product embodied in any tangible medium of expression having computer-usable program code stored therein. For example, some embodiments described below with reference to flowchart illustrations and/or block diagrams of methods, apparatus (systems) and computer program products can be implemented by computer program instructions. The computer program instructions may be stored in computer-readable media that can direct a computer or other programmable data processing apparatus to function in a particular manner, such that the instructions stored in the computer-readable media constitute an article of manufacture including instructions and processes which implement the function/act/step specified in the flowchart and/or block diagram. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

In the following description, reference is made to the accompanying drawings which are illustrations of embodiments in which the disclosed invention may be practiced. It is to be understood, however, that those skilled in the art may develop other structural and functional modifications without departing from the novelty and scope of the instant disclosure.

Generally, the present invention concerns a system and methods for facilitating direct communication between a potential real estate buyer and a property's listing agent. This is particularly useful and implemented through an online platform which displays for-sale properties. The system may provide in-line contact information of the listing agent of a particular property, presenting it in the user interface of the online platform, without requiring a user leave the online platform to find this contact information elsewhere, likely never to return. This disclosure also improves the user interface of the computerized online platform by providing a contact display in a manner which integrates it into the user interface, without visually disrupting the user's browsing experience or drawing the user away from the online platform into another window, tab, or platform.

As is known in the art, sites such as Zillow® and Realtor.com® fail to provide a way for a consumer (potential home buyer) to contact a listing agent directly. In the current state of the internet and modern communications, the consumer wants to go directly to the listing agent, but there is no system in place for them to accomplish this. This problem is solved by the present disclosure. Moreover, the disclosure goes further to provide an online platform which, upon request, provides a listing agent information dynamically in-line on the user interface of the online platform. This presentation of listing agent contact information, in some embodiments, may be available only upon satisfying certain conditions, such as being a logged in user, being a qualified user, being able to afford the property, credit-worthiness, listing agent opting in or responding to a user request, and the like.

In some embodiments, the online platform is set up such that a buyer can "list" themselves as an interested or qualified home buyer. This may include, as will be discussed throughout, listing search criteria about the home they would like (zip code or neighborhood, bedrooms, size, price, bathrooms, property type, and so on). This may also include qualification information as discussed herein. In turn, a listing agent selling a property may easily find these buyers and directly communicate with them, and/or the same buyers may be provided, through the online platform, the contact information to directly get in touch with the listing agents without confusion or frustration, and with full transparency about who the potential buyer is communicating with.

In another aspect, a platform allowing agents to connect and communicate directly with each other is disclosed. This platform allows listing agents to let other real estate agents know about properties that are coming to the market, or are not on the market but are for sale, along with other related information. Such a platform may be broken into particular markets, such as by zip code, town/city, neighborhood, geographic region, and the like. In such an aspect, a server is in networked communication with various computers through the internet. The server, as with the other computers disclosed herein, has at least a processor, a memory, and programming instructions stored on the memory to cause the processor to carry out the disclosed steps and processes. Upon receipt of a message from one of the computers connected through the internet to the server, it is operable to save the message, and then automatically generate a posting data file. This posting data file can be accessed through the internet on a user interface accessible through, for example, an app or web browser.

Communication as disclosed herein includes providing a contact information of a seller agent, such as phone number, email address, address, chat contact information, and other related modes of communication. It may also be in the form of a direct chat or other communication portal within the online platform. Further, communication may also be in the form of the system providing a contact information of the interested buyer to the listing agent, to allow the listing agent to evaluate the potential buyer after initial contact to the listing agent from the potential buyer.

In one embodiment, the invention may be in the form of a computerized system for directly connecting a listing agent and a potential home buyer. The system involves multiple networked computers in communication with each other. A central server is in communication with one or a plurality of user computers, as well as one or a plurality of listing agent computers. This server is operable to receive inputs from the user computers relating to identifying information, property interest information, and the like. Identifying information may be in the form of name, address, email address, and/or phone number. In certain embodiments, identifying information may also include property buying qualifications such as a credit rating or information required to determine credit worthiness, income, assets, and the like. Similarly, the server may receive inputs from the listing agent computer, including an input to initiate a contact to an interested user. This input may be broad based, such as an automatic authorization to provide contact information to the interested user, slightly limited, such as to provide contact information only if the user has established that they are a qualified buyer for a particular property (i.e. able to afford a particular price level of a property and/or creditworthiness), or may be manual, such that the listing agent may manually provide an input, via the listing agent computer, to the server to cause the server to release the listing agent information and/or open up a chat or other communication portal. As noted above, in almost all embodiments, the potential buyer must initiate communication with the listing agent. This is generally done before the system or potential buyer releases any information to the listing agent, such as the potential buyer's identifying information, qualification, and the like. Such information may be released manually by the potential buyer, or at a certain stage of the buying process.

Figure 2:
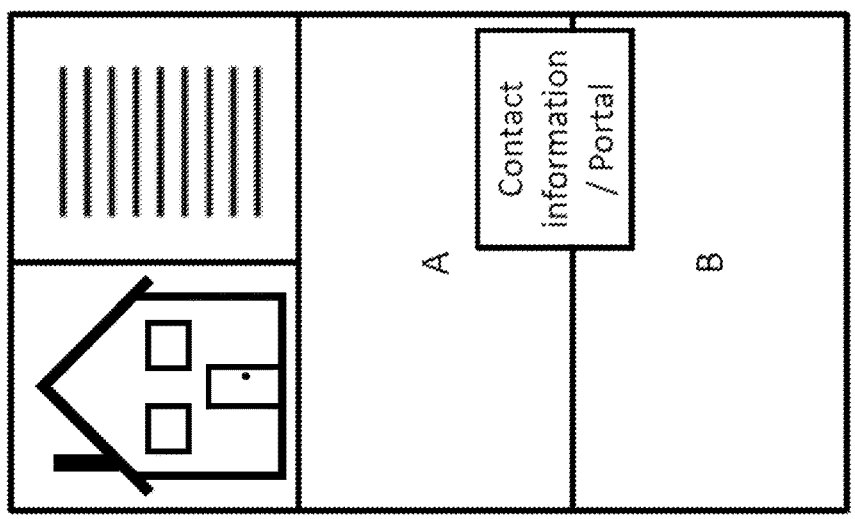
FIG. 2 provides a schematic view of an embodiment of the system which overlays a pop-up window over the content of the existing online portal.
Figure 2:
Figure 2:
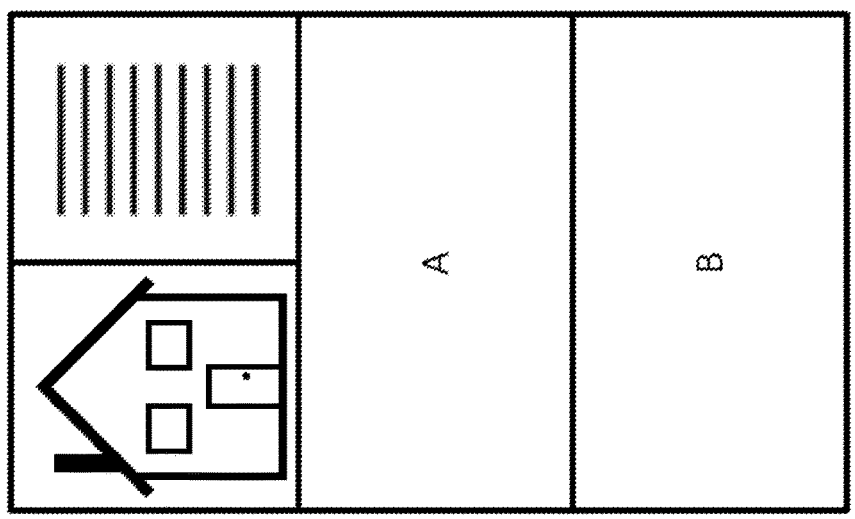

As noted, the communication is, in many embodiments, presented on a contact display which is a frame, area, or window within the user interface of the online platform. This means that the system is operable to dynamically insert the contact information on a particular page, or to display a pop up window which remains within the platform user interface, and is layered over certain information of the platform user interface, as shown in FIGS. 1 and 2. Examples of the contact display include, but are not limited to a chat window which allows direct communication between user and listing agent, listing of contact information such as a telephone number or email address, a direct contact link such as a hyperlink which allows contact to the listing agent, and the like.

The computerized system may be operable to automatically determine if a user is qualified to buy a particular property. In this embodiment, a user may input financial qualification information such as income, assets, credit rating, and so on. This user information, along with contact information, may be stored in a memory on a system server. This may be used by the system to calculate a financial qualification, such as a maximum budget of the user. If a particular property has a price above the user's maximum calculated budget, the system may use this information to, for example, prevent a user from accessing the contact information of the listing agent, or may provide a marker or notice in any communication from the user to the listing agent that affordability may be a problem. This provides the clear advantage that a listing agent can immediately determine if a potential buyer is worth engaging with. Further, the system may communicate the user's maximum calculated budget and/or general financial qualifications to the listing agent, allowing the listing agent to provide other properties to the potential buyer.

In yet a further embodiment, the server may be operable to automatically generate and provide to a listing agent a list of qualified buyers who have provided their financial qualification information. In certain instances, the system may also provide a notification that a new property is listed, along with the listing agent's contact information. The notifications may be provided in any manner, such as an alert through an app or web interface, an email, written correspondence, and the like. Real estate listings available to the present system may be saved directly on the system memory, or may be accessed from an external service, such as the Multiple Listing Service ("MLS").

In another embodiment, the disclosure may be implemented as a method for populating an online platform with a contact information of a real estate listing agent. The method involves a computerized system which presents at least one real estate property sale listing on an online interface. This listing includes, at least, an address and a price. Next, an interest request is received through an online communication through this online user interface from a first user. In response to this interest request, the contact information of a listing agent is provided within the online user interface. The presenting may be, among other options, in an in-line frame of the user interface and associated with the primary viewing window or "page" of the interface. Or, in another embodiment, the presenting may be a pop-up window within the primary viewing page. This allows the listing agent to communicate directly with the potential buyer if the potential buyer has first initiated communication, either through traditional means, or through an interface within the online platform which carries out the method.

Moreover, in certain embodiments, the online platform may present to a potential buyer-user that there is a variable rate commission on a particular listing. As used herein, the term "variable rate commission" shall mean a contract for a listing where one amount of commission is payable if the listing broker is the procuring cause of sale/lease and a different amount of commission is payable if the sale/lease results through the efforts of a cooperating broker. This way, the buyer can see how much the seller is paying for a transaction that includes a buyer agent, versus how much the seller is paying for a transaction without the buyer agent.

Turning now to FIG. 1, an embodiment of how the system dynamically presents a contact display on the computer user interface accessing the online platform of the system. These views show an embodiment of a primary viewing page of the user interface, including photographs, listing details, content A, and content B. Content A and B are representative of information relating to the listing. In this view, a display page of a real estate listing is shown. Information may include photos of the real estate property, description, and other pertinent information. Between a content A and a content B, upon a receipt of a user's request for information, the system is operable to automatically present a contact display such as listed contact information, a direct communication portal, and the like. In this embodiment, the contact display is automatically populated in line on the primary viewing page between content A and content B. In one embodiment, the inline embedded frame may appear directly after a display of a name of the listing agent, pushing the remaining content downward. This allows a user to access the contact information of the listing agent, without having to leave the online platform to use a search engine to look up the listing agent.

FIG. 2 provides another embodiment of how the system dynamically presents a contact display on the user interface of a computer accessing the online platform of the system. In this view, a display page of a real estate listing is shown. Information may include photos of the real estate property, description, and other pertinent information. The system is operable to automatically present a contact display, in this embodiment presented as a pop-up overlaying content displayed on the user interface. The pop-up is presented upon a receipt of a user's request for the listing agent contact information. In this embodiment, the contact display is automatically populated in a pop-up within the primary viewing page comprised of content A and content B, overlaying a portion of the viewing page. This allows a user to access the contact information of the listing agent.

Figure 3:
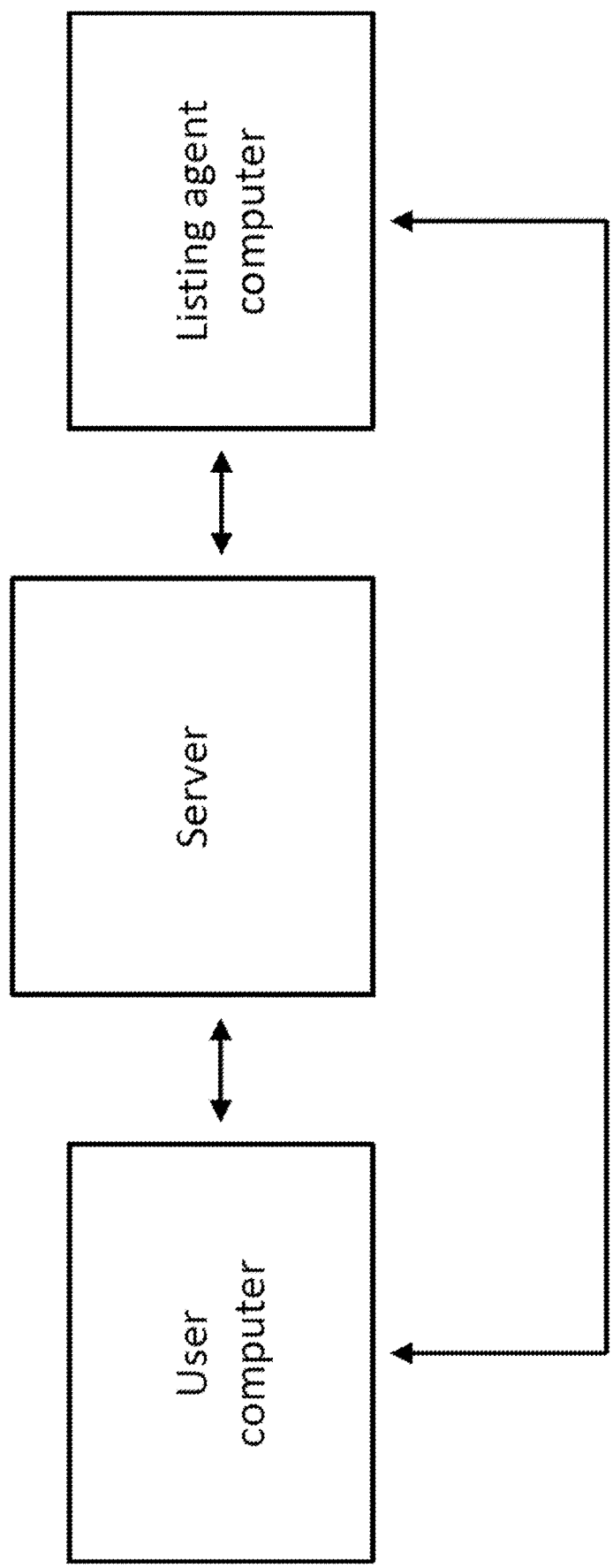
FIG. 3 provides a schematic view of data flow of an embodiment of the present disclosure.

FIG. 3 provides a view of an embodiment of data flow within the system. In this view, a user computer and listing agent computer are each connected to a server, usually through the internet or similar networked communication. The server is operable to store data in a memory such as property information, user information, and listing agent information. The server is also operable to allow the user computer and listing agent computer to access certain data through an online platform which is presented on a user interface of a user/agent computer. For example, users may access one or a plurality of real estate listings. Listing agents may, for example, post real estate listings, access data or communications relating to their real estate listings, manage their account, and the like. Further, in certain embodiments, upon actuation, the server may facilitate direct communication between the user computer and listing agent computer, as shown by the two way arrow between user computer and listing agent computer.

Figure 4:
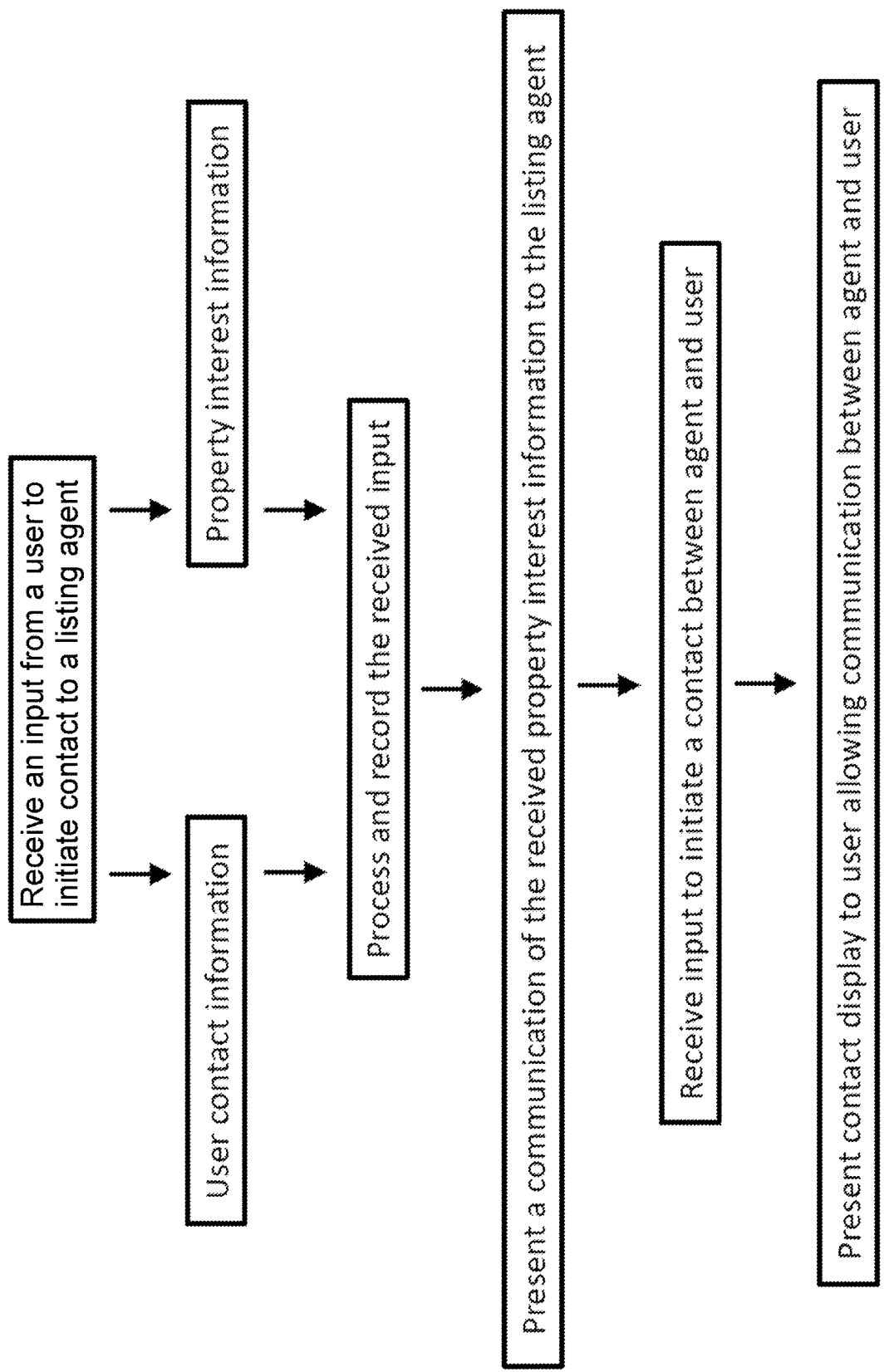
FIG. 4 provides a flow chart an embodiment of the present disclosure.

FIG. 4 provides a flow chart of an embodiment of operation of the present system. In this chart, the operations begin with a received input from a user to the server. This input may include at least one of a user contact information or a property interest information. The server is operable to process and record this input. The server is operable to send a communication, such as a notification to the listing agent. This notification may be immediate, or may be sent at periodic intervals, as requested by the listing agent. For example, a daily, every-other day, weekly, etc. list communications of users who have expressed interest in the property may be sent to the listing agent. In a particular embodiment, the communication from the server to the listing agent may comprise a list of potential buyers for a listed property which is generated by the server based on at least the received input from the user computers.

The server may receive an input to initiate contact between the agent and user. This may be in response to the communication received by the listing agent, but also may be done automatically and/or if the user has established that he/she is a qualified buyer. In other words, the receiving of an input to initiate contact between agent and buyer need not be exclusively in response to the listing agent receiving a notification from the system, it may also be based on certain user/agent preferences. Indeed, a listing agent may provide information to the server authorizing an automatic contact initiation to any interested or qualified user. Finally, as at least part of the contact initiation, a contact display is presented on a user interface of the user computer allowing communication between agent and user. This communication may be in the form of a chat window or other live communication within the user interface, or may be as simple as providing a phone number or email address to allow the user to contact the agent directly. It will be understood that any information allowing a user to contact the agent will be sufficient.

FIG. 5 provides another flow chart of an embodiment of operation of the present system. In this embodiment, the system is operable to present one or more real estate listings on an online platform to a user. A user may then identify a real estate listing of interest, and send a request, through the user interface, to the system. The computerized system, which as noted above is operable on a network server, receives this interest request from the user. This receiving may be in the form of any input to the user interface. For example, the receiving may be initiated by a user clicking a link, hovering over an area representing the listing agent, swiping, gesturing, and the like. In response, the system may display a contact information of a listing agent somewhere within the user interface of the online platform of a user computer. For example, this display of the contact information may be in an in-line frame, imbedded within the page, pop-up window, and the like. In this way, the user and listing agent can communicate directly regarding the sale of the property without the user having to navigate away from the system user interface.

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

Those skilled the art will readily observe that numerous modifications, applications and alterations of the device and method may be made while retaining the teachings of the present invention.

What is claimed is:

1. A computerized system for directly connecting a listing agent and a potential home buyer comprising:
    a first user computer in networked communication with a computerized server, the first user computer accessing the system through an online platform via a user interface;
    a listing agent computer in networked communication with the server;
    the computerized server operable to:
        receive an input from the first user computer comprising a quantity of user contact information and a property interest information comprising at least one of information selecting one of a plurality of listed property and a property interest search criteria;
        process and record the received input in a memory of the server;
        calculate a qualification of a user of the first user computer, the server further operable to receive a financial qualification from the first user computer, and calculate the qualification of the user based on the financial qualification;
        present, to the listing agent computer, a communication of the received property interest information through a user interface of the listing agent computer;
        wherein the communication of the received property interest information to the listing agent computer comprises a list comprising a plurality of potential buyers for a listed property, the list generated by the server based on at least the received input from the first user computer;
        receive an input from the listing agent computer to initiate a contact to the first user computer;
        present, on the user interface of the first user computer, a contact display, the contact display associated with a primary viewing page of the online platform or as a pop up window within the primary viewing page, so as to cause the listing agent and user of the first user computer to directly communicate; and
        wherein the server is further operable to present to the user of the first user computer whether at least one of the plurality of listed property has a variable rate commission.

2. The system of claim 1 wherein the contact display comprises a chat window.

3. The system of claim 1 wherein the contact display comprises a contact information comprising a telephone number of the listing agent.

4. The system of claim 1 wherein the contact display comprises a contact information comprising an email address of the listing agent.

5. The system of claim 1 wherein the contact display comprises a contact information comprising a direct contact link operable through the online platform.

6. The system of claim 1 wherein the qualification comprises a maximum budget of the first user, and wherein the communication of the received property interest information to the listing agent computer lists one of the maximum budget and if a first listed property is affordable to the first user.

7. The system of claim 1 wherein the server provides, to the first user computer by networked communication, a listing of for sale real estate properties.

8. The system of claim 7 wherein the listing is stored on the server in a memory.

9. The system of claim 7 wherein the listing is accessible to the server through a networked communication to an external service.

10. The system of claim 1 wherein the server stores a user information associated with the first user computer in a memory, the first user information comprising identification information of a first user account, and the property interest information.

11. The system of claim 1 wherein the server is further operable to present to the user of the first user computer an option to communicate directly with the listing agent of the listing agent computer or communicate with a buyer agent of a second user computer.

12. The system of claim 1 wherein the communication of the received property interest information to the listing agent computer is a notification.

13. The system of claim 1 wherein the property interest information of the input received by the server further comprises a zip code of the at least one of the plurality of listed property, and the server is further operable to present to the user of the first user computer a plurality of buyer agents associated with the at least one of the plurality of listed property.

14. The system of claim 1 wherein the server is operable to not present the quantity of user contact information to the listing agent computer unless the server receives an input from the first user computer directly communicating the quantity of user contact information to the listing agent computer.

* * * * *